United States Patent [19]

Crittenden

[11] Patent Number: 4,638,776

[45] Date of Patent: Jan. 27, 1987

[54] ROTARY INTERNAL COMBUSTION ENGINE

[75] Inventor: William Crittenden, Salt Lake City, Utah

[73] Assignee: Matt Biljanic, Salt Lake City, Utah

[21] Appl. No.: 718,843

[22] Filed: Apr. 1, 1985

[51] Int. Cl.$^4$ ............................................. F02B 53/04
[52] U.S. Cl. .................................................. 123/235
[58] Field of Search ................................ 123/235, 236

[56] References Cited

U.S. PATENT DOCUMENTS

| 1,255,865 | 2/1918 | Doane | 123/235 |
| 3,487,816 | 1/1970 | Wild | 123/235 |
| 3,902,465 | 9/1975 | Stookey | 123/236 |

FOREIGN PATENT DOCUMENTS

| 2311868 | 9/1974 | Fed. Rep. of Germany | 123/235 |
| 622027 | 6/1961 | Italy | 123/236 |
| 66601 | 5/1980 | Japan | 123/236 |

*Primary Examiner*—Douglas Hart
*Attorney, Agent, or Firm*—Richard F. Bojanowski

[57] ABSTRACT

A rotary internal combustion engine has adjacent circular compression and combustion rotors fixed to a shaft and each having a radial vane sliding on an inner surface of a surrounding eccentric circular chamber, and an arcuate transfer passage communicating between the chambers through an intermediate wall via slots in the rotors adjacent the vanes.

10 Claims, 4 Drawing Figures

ROTARY INTERNAL COMBUSTION ENGINE

FIELD OF THE INVENTION

The present invention relates to a rotary internal combustion engine and, more particularly, to a rotary internal combustion engine wherein the eccentric compression chamber and combustion chamber are offset.

BACKGROUND OF THE INVENTION

Rotary internal combustion engines are currently being produced as the Wankel engine. However, this engine does not use retractable vanes to improve thrust during the combustion cycle. Rotary engines in which vanes are employed can be found in U.S. Pat. Nos. 1,217,733; 2,179,401; 3,103,919 and 3,902,465.

Although the above prior art shows various methods for transferring compressed gases into a combustion zone, none utilize offset eccentrically opposed compression and combustion chambers. With the above arrangement, combustion gases can be transferred directly from the compression to the combustion chamber and thereby avoid the need of a transfer chamber. This results in a more efficient system both from an operational and economic standpoint.

OBJECTS AND ADVANTAGES OF THE INVENTION

It is therefore a primary object of this invention to provide a rotary engine whereby compressed gases can be efficiently transferred from the compression chamber to a combustion chamber.

Another object of this invention is to position the fuel compression chamber in an offset or sinoidal relationship with the combustion chamber and thereby provide a simplified means for maintaining separate and distinct chambers.

These and other objects and advantages of the present invention will no doubt become more obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
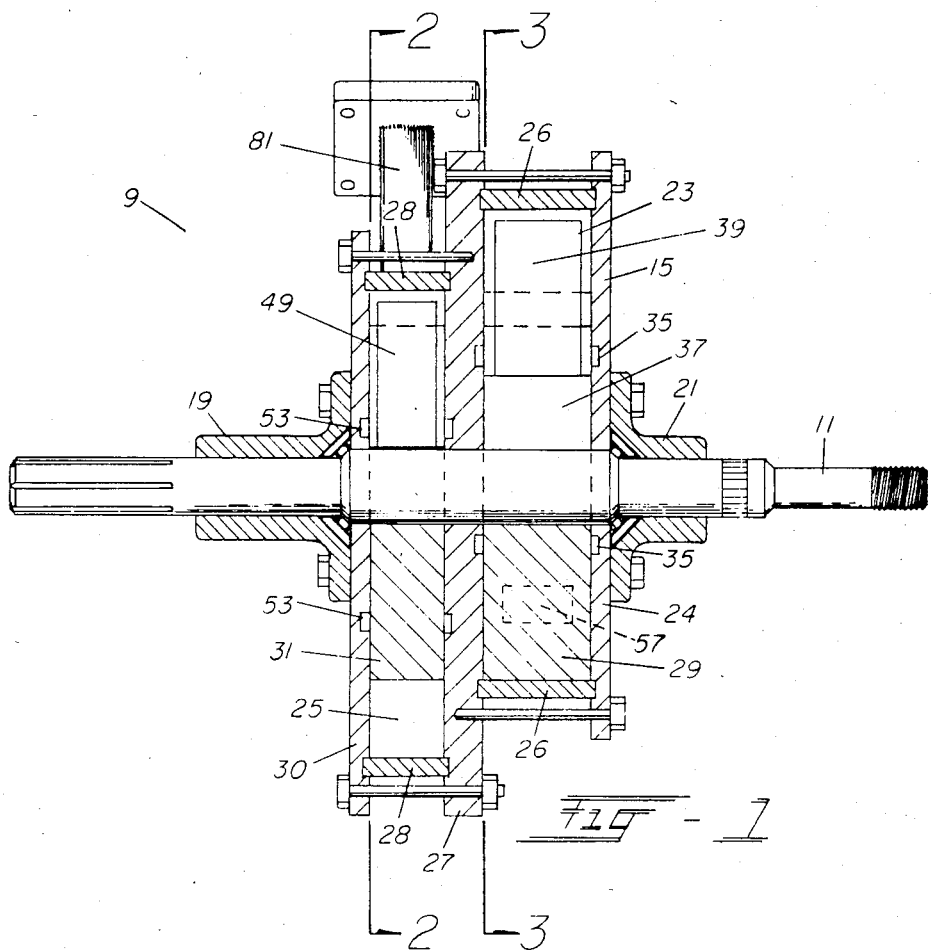
FIG. 1 is a side view, partially in section, of a rotary internal combustion engine according to the present invention.
Figure 4:
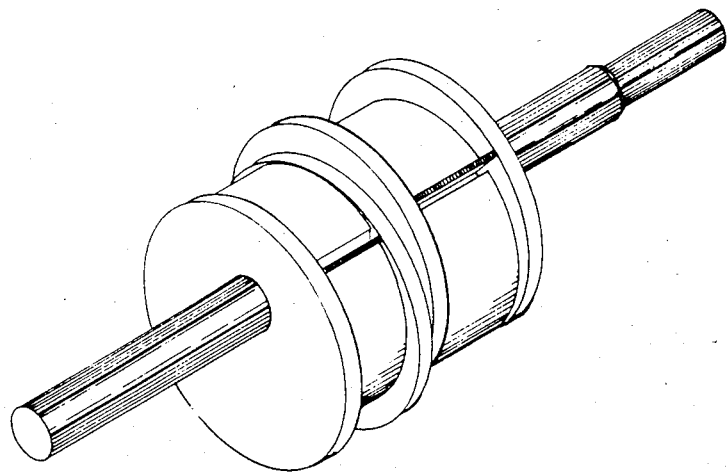
FIG. 4 is a pictorial view of a rotor utilized within the compression and combustion chamber of the rotary engine shown in FIG. 1.
Figure 2:
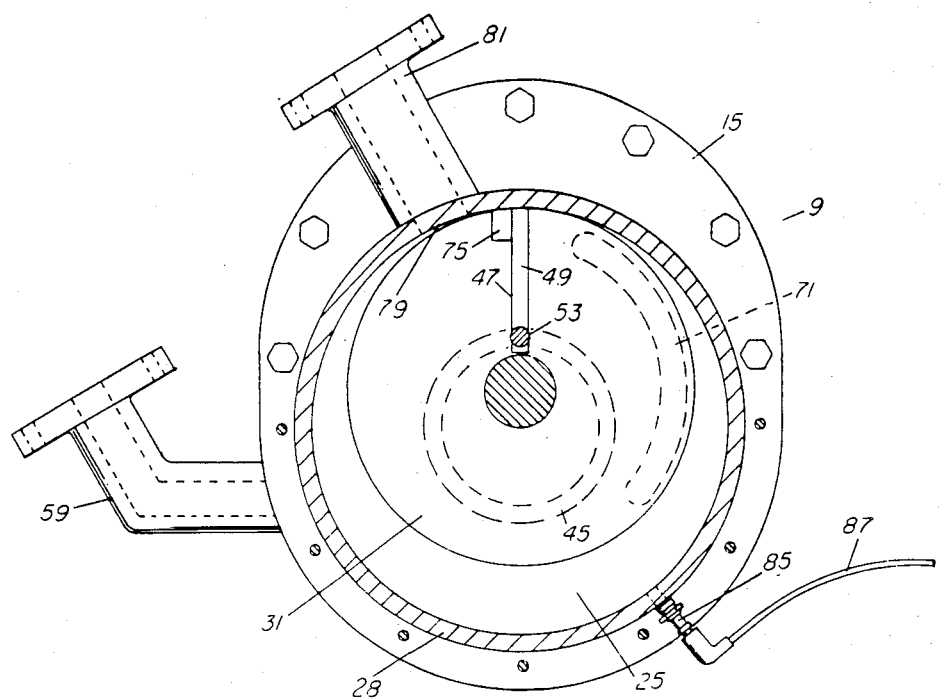
FIG. 2 is a cross-sectional view taken along the line 2—2 in FIG. 1 for viewing in the direction of the arrows to illustrate the combustion chamber of the engine of FIG. 1.
Figure 3:
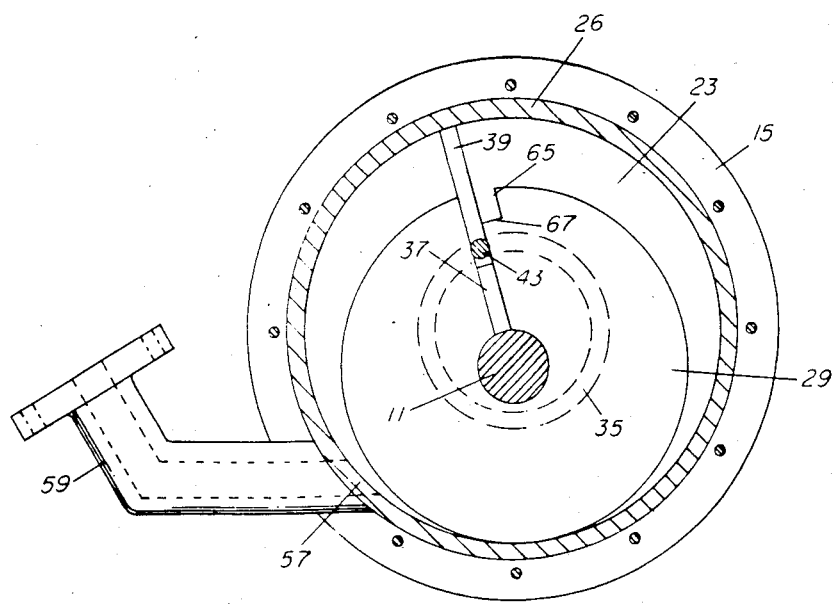
FIG. 3 is a cross-sectional view taken along the lines 3—3 in FIG. 1 for viewing in the direction of the arrows to illustrate the compression chamber of the engine of FIG. 1.

Referring to FIGS. 1 through 3, a rotary internal combustion engine 9 generally includes a straight driven shaft 11 supported for rotation within an engine housing 15 by journal means 19 and 21 sealingly mounted at opposite ends of the housings. Within the housing 15 is formed a compression chamber 23 and an adjoining combustion chamber 25. Keyed concentrically to the shaft 11 for rotation therewith within the compression chamber 23 is a first circular rotor member 29. Similarly, keyed concentrically to the shaft 11 within the combustion chamber 25 is a second circular rotor member 31.

Throughout this specification and claims reference shall be made to first items and second items. For ease of understanding, all first items shall refer to items dealing with "compression". All second items shall refer to items dealing with "combustion".

The compression chamber 23 is circular in cross section (FIG. 3) but is arranged eccentrically relative to the axial center line of the drive shaft 11. Likewise, the combustion chamber 25 (FIG. 2) is circular in cross section and is disposed eccentrically relative to the centerline of the drive shaft 11. The compression chamber and combustion chamber are offset relative to one another (FIG. 1). More specifically, the compression chamber 23 is defined by opposed circular sidewalls 24 and 27 spaced from one another by a ring-like wall 26 which defines the periphery of the compression chamber. Likewise, the combustion chamber 25 is defined by opposed circular sidewalls 27 and 30 spaced from one another by a ring-like wall 28 which serves to define the periphery of the combustion chamber 25.

Referring now to FIGS. 1 and 3, first and second circular guide tracks 35 and 45 are formed in the sidewalls 24 and 27 of the compression chamber 23 and combustion chamber 31 which circular tracks are concentric about the center of the circular sidewall 24.

As best shown in FIG. 3, a first radially-extending slot 37 is formed through the rotor member 29 in the compression chamber 23, which slot slidably receives a flat plate member 39 which is descriptively referred to as a first piston-vane. More particularly, the slot 37 is open at both sides of the circular rotor member 29 as well as the periphery. However, one or both of the sides may be enclosed as the only requirement being that the pin 43 may move radially. The radial length of the slot 37 in the rotor member 29 is a matter of design choice except that such length must be sufficient that the slot 37 and the circular guide track 35 in the adjacent sidewall of the compression chamber 23 are always in communication with one another regardless of the angular position to which the rotor member 29 is rotated. The piston-vane 39, as thusly located within the radially-extending slot 37, defines a plane which extends perpendicularly towards the sidewalls of the rotor and which is slidably movable in a direction radial of the rotor. The length of the piston-vane 39 can be varied. Preferably it should be of such length and/or weight such that it will be balanced during rotation of the rotor member 29 and thereby avoid "wobbling".

Connected to the piston-vane 39 is a guide means, shown as first peg or pin member 43 in the illustrated embodiment, which is in mechanical communication with the circular guide track 35. The piston-vane 39 is dimensioned such that it extends radially outward from the peg member 43 to slidably abut the opposed interior sidewalls 26 of the compression chamber 23.

The kinematics of operation of the piston-vane 39 and the compression rotor 29 may best be understood upon consideration of FIG. 3. As mentioned earlier, this drawing shows the compression rotor 29 mounted for rotation with the shaft 11 which, in turn, is mounted eccentrically within the compression chamber 23 as defined by the circular sidewall 24 of the chamber. The space between the periphery of the rotor 29 and periphery of the compression chamber has a crescent shape as depicted in the drawing; the apex of the crescent shaped space should be understood to be the location where the rotor 29 is essentially in contact with the peripheral walls 26 of the compression chamber 23. As the rotor 29 rotates clockwise with the shaft 11, the piston-vane 39 reciprocatably progressively extends from the slot 37 within the rotor 29 from a fully retracted position (approximately 6:00 o'clock position). As the rotor continues to rotate clockwise past the 12:00 o'clock position, the piston-vane 39 is progressively retracted into the rotor. Thus, for example, at the 3:00 o'clock position, the piston-vane is retracted about half-way. The motion of the piston-vane 39 is determined by the rotational position of the rotor 29 and the action of the guide means 43 travelling through the circular guide track 35. (For purposes of explanation, the guide track 35 is indicated by dashed lines in FIG. 3). Because the circular guide track 35 is concentric with the center of the compression chamber 23, the distal end of the piston-vane 39 is maintained equidistant from the center of the compression chamber. More particularly, the length of the piston-vane 39 is such that its distal end, during rotation, sealingly engages the peripheral wall 26 of the compression chamber while at the same time can be sufficiently counter balanced by a weight distribution means or an extension of the piston-vane 39 to avoid "wobbling". Accordingly, the piston-vane 39 partitions the crescent-shaped area in the compression chamber and, as will be explained later herein in detail, this partitioning action is utilized to accomplish the compression of gases within the compression chamber 23.

The kinematics of the components within the combustion chamber 25 can also be readily understood, as those components are essentially analogous to the above-described elements within the compression chamber 23. Thus, as shown in FIGS. 1 and 2, the second rotor member 31 in the combustion chamber 25 has a second radial slot 47 formed therein, a second piston-vane 49 is slidably mounted within the slot 47, and a second guide means 53 is fixedly connected to the second piston-vane 49 to run in a second circular guide track 45 formed in the sidewalls 27 and 30 of the combustion chamber 25. Because the combustion rotor 31 is mounted eccentrically within the combustion chamber 25, a crescent shaped space is formed between the periphecy of the rotor 31 and the peripheral wall 28 of the combustion chamber, with the apex of the crescent-shaped space being a point where the rotor 31 is essentially in contact with the peripheral wall 28. As the combustion rotor 31 rotates clockwise with the shaft 11, the second piston-vane 49 reciprocatably extends from the second rotor 31, beginning with a position fully retracted within the second slot 47 (the 12:00 o'clock position) to a position fully extended from the slot (the 6:00 o'clock position), then back to the fully retracted position. As in the operation of the compression chamber, the motion of the second piston-vane 49 in the combustion chamber is determined by the rotational position of the rotor 31 and the action of the second guide means 53 travelling along the circular guide track 45.

Again, because the circular guide track 45 is concentric with the center of the compression chamber 25, the distal end of the second piston-vane 49 is maintained equidistant from the center of the combustion chamber and in sliding engagement with the peripheral wall 28 of the chamber. Accordingly, the radially moveable second piston-vane 49 partitions the crescent-shaped space within the combustion chamber 25 just as the first piston-vane 39 partitions the compression chamber 23.

As with the piston-vane 39, the second piston 49 is of such length or possesses a weight distribution to effectively counter balance the system during rotation and thereby avoid "wobbling".

Referring again to FIGS. 1 and 3, a preferred means is illustrated for introducing a carburated mixture of fuel and air into the compression chamber. In this embodiment, a port 57 is formed in the peripheral wall 26 of the compression chamber, which port is in gaseous flow communication with a conduit 59 which carries a carburated vaporous mixture of fuel and air to the port. In FIG. 3, the first or compression rotor 29 is shown at a position of angular rotation whereat the first piston-vane 39 has passed the fuel feed port 57; At such a position, it should be understood that the portion of the crescent-shaped compression space trailing the piston-vane 39 has been filled with a carburated fuel-air mixture under the same pressure or the pressure of introduction of the mixture through the port 57. Also in FIG. 3, it should be noted that a first cut-out slot 65 is formed in the periphery of the compression rotor 29 immediately adjacent the radial slot 37 and on the leading side of the piston-vane 39. Preferably, the slot 65 extends radially inward of the rotor 29 approximately ten to thirty percent of the radius of the rotor 29 or sufficiently to communicate with the arcuate port 71. (In the drawings, the radially inward edge of the slot 65 is designated by the numeral 67.) As will be explained later herein in detail, the cut-out slot 65 operates in communication with an arc-shaped port 71 (FIG. 2) formed through the sidewall 27 between the compression chamber 23 and the combustion chamber 25, which arc-shaped opening is formed by radially concentric with the axial centerline of the shaft 11. More particularly, the radially-outward edge of the arc-shaped port 71 is located inwardly of the peripherus of the rotor members 29 and 31, and the radially-inward edge of the arc-shaped port is located in the same radial plane of the edge 67 of the cutout slot 65 in the rotor member 29.

In the assembled condition, the face of the compression rotor member 29 is located closely adjacent the sidewalls 24 and 27 of the compression chamber 23 such that the rotor member blocks gas-flow communication between the interior of the compression chamber and the arc-shaped port 71 except when the cut-out slot 65 is in registry with the arc-shaped port 71.

Referring now to FIG. 2, it should be noted that a second cut-out slot 75 is formed in the periphery of the combustion rotor 31 immediately adjacent the second radial slot 47. In contrast to the first cut-out slot 65 in the compression rotor 29, the second cut-out slot 75 in the combustion rotor 31 is formed adjacent the trailing edge of the second piston-vane 49. The cut-out slot 75 extends radially inward of the periphery of the rotor 31 to the same radial extent as first cut-out slot 65 so that the second slot 75 is in communication with the arc-shaped port 71. (Preferably, the depth of the cut-out slot 75 is such that the radially inward edge of the arc-shaped port is encompassed by the cut-out slot).

As also shown in FIG. 2, a port 79 is formed through the peripheral sidewall 28 of the combustion chamber 25 to accomodate the flow of combusted gases from the chamber. A minifold 81 is attached in gas-flow communication to the exhaust port 79 to conduct combusted gases therefrom. More particularly, the exhaust port 79 is located slightly in advance of the apex of the combustion chamber relative to the direction of rotation of the combustion rotor (clockwise in FIG. 2). It should be noted that with the rotary engine herein described, essentially all of the exhaust gases are removed.

At this juncture, the method of compressing carburated gases within the compression chamber 23 can be understood, as can the method of exhausting the compressed gases from the compression chamber 23 into the combustion chamber 25. Initially, it should be assumed that the piston-vane 39 of the compression chamber 23 are such that a carburated mixture of air and fuel was drawn into a compression chamber. Accordingly, as the compression rotor 29 continues to rotate, the gases in the chamber 23 will be compressed in advance of the piston-vane 39. That is, the gases will be compressed as rotation of the compression rotor 29 moves the piston-vane 39 clockwise in the crescent-shaped compression chamber. At a certain angular position in the illustrated embodiment, (about the 1:00 o'clock position) the cut-out slot 65 in the periphery of the compression rotor 29 will move into registry with the arcuate port 71; and likewise do does the cut-out slot 75 in the periphery of the combustion rotor 31. (Accordingly, it may be understood that the second piston-vane 49 in the combustion rotor 31 leads the piston-vane 39 by about 7°-15° in the illustrated embodiment). In practice, the second piston-vane should lead the compression vane by the width of the cut-out slots by at least 1°. Thus, with the cut-out slots 65 and 75 both in registry with the arc-shaped port 71, compressed gases which are at pressure above ambient, flow from the compression chamber 23 into the combustion chamber 25 which is at a pressure below ambient. This differential pressure is created by the urging of the piston-vane 39 against the gases and the vacuum created in the combustion chamber 25 by passage of piston-vane 49 therethrough. In practice, such communication between the compression chamber and combustion chamber continues essentially until the piston-vane 39 reaches the apex of the compression chamber. When the piston-vane 39 approaches the apex of the compression chamber 23, gas-flow communication with the combustion chamber 25 is blocked by the body of both rotors 29 and 31. During the period that the space between the leading face of the piston-vane 39 and the apex of the compression chamber is diminishing, the space between the trailing face of the piston-vane 39 and the apex of the compression chamber is increasing. This enlargement of the latter space creates a negative pressure within the space which, in turn, draws the carburated fuel-air mixture into the space via the carburetor port 57. Such communication with the carburetor port continues until such time as the piston-vane moves past the port 57 and, again, traps the carburated mixture in advance of the direction of rotation and begins to compress the thusly-contained gases. Accordingly, the compression cycle is repetitive with each revolution of the compression rotor 29.

With the preceding explanation in mind, the combustion cycle within the engine 9 can also be readily understood in conjunction with FIG. 2. The cycle may be understood to commence after the combustion rotor 31 has rotated past the apex of the combustion chamber sufficiently that the cut-out slot 75 adjacent the trailing side of the piston-vane 49 and the apex of the combustion chamber is increasing, a negative pressure is created within that space and, hence, compressed gases from the compression chamber 23 are readily forced into the combustion chamber. Concurrently, any gases in the space between the leading face of the piston-vane 49 and the apex of the combustion chamber are expelled, via the exhaust port 79, due to the urging of the piston-vane 49 and the positive pressure thereby created. As the combustion rotor 31 continues to rotate, the cut-out slot 75 moves out of registry with the arcuate port 71 (in the illustrated embodiment, at about the 4:00 o'clock position) so that, in effect, the space between the apex of the combustion chamber and the trailing face of the piston-vane is gas tight.

In FIG. 1, the compression and combustion rotors are shown to be essentially the same thickness. However, it should be noted that the rotors may be of different thicknesses depending on the desired compression or pressure ratios desired. As the sizes are varied, the volume available in the crescent shaped space are varied thus altering the compression or pressure ratios.

At this point, it may be noted that, when the compression chamber 23 is in communication with the combustion chamber 25, the compression zone in advance of the piston-vane 39 in the compression chamber is decreasing rapidly whereas the combustion zone following the piston-vane 49 in the combustion chamber is increasing rapidly. Such interaction, it may be noted, is possible because the circular combustion chamber is spatially offset relative to the circular compression chamber.

One of the reasons for utilizing the offset arrangement is that both the compression and combustion rotors 29 and 31 can be concentrically aligned with the shaft 11, yet permit the combustion vane to reach its apex about 180° before the compression vane reaches its apex. This allows the transfer of the compressed gases at its maximum compression point directly behind the vane of the combustion rotor through the arcuate port. This eliminates the need of a transfer line or a transfer chamber in between the compression and combustion chambers. The momentum of both rotors in not impeeded or otherwise hampered during the transfer process. If the two chambers were not offset, an intermediate transfer chamber would be required. By utilizing the offset arrangement, complicated valving systems can be eliminated and the transfer of the fuel mixture from the compression chamber to the combustion chamber can be achieved without substantial loss of energy or momentum.

It is desirable for the compression and combustion chambers to be offset at an elevation of at least 2° from horizontal. Generally, an offset of between 3° to 60° with a more preferred range being between about 10° to 50°.

After the cut-out slot has rotated with the combustion rotor 31 to a position where there is no longer communication with the arcuate port 71, the ignitition cycle can be initiated by means, for example, of a spark plug 85 activated by electrical current carried through ignition wires 87. The spark applied to the compressed carburated gaseous mixture behind the piston-vane 49 causes the mixture to explode, and the expanding gases drive the piston-vane 49 to travel in the clockwise direction with the rotor 31. In essence, this is the driving force of the engine 9, which force is applied to the shaft 11 by the combustion rotor 31. The driving force continues until such time as the piston-vane 49 passes the exhaust port 79, at which time the by-then expanded gases are carried to discharge via the manifold 81. Such discharge of the exhaust gases is assisted by the leading face of the piston-vane 49 after the vane passes the apex of the combustion chamber.

At this point, it can be readily understood that the rotational driving action of the combustion rotor 31 is transferred to the compression rotor 29 (via shaft 11) and hence causes the process to repeat itself. It may be further realized that further pairs of compression and combustion chambers can be added, each pair acting on the same drive shaft 11, to produce a smoother and increased flow of power. The net power output from the shaft 11 can be utilized, of course, for a chosen purpose via suitable coupling means. In some cases it may be advantageous to include additional vanes in both the compression and combustion chambers to improve power output and for ease in counter balancing the rotors hereinbefore described. In such cases, there would be two compression and two combustion cycles accuring with each 360° revolution of the rotors.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:
1. An improved rotary internal combustion engine comprising:
   (a) a combustion chamber which is generally circular in cross-section and which has a ring-like peripheral wall;
   (b) a driven shaft member journaled for rotation and disposed to pass eccentrically through the combustion chamber;
   (c) a compression chamber which is generally circular in cross-section positioned with a ring-like wall is adjacent to and spatially offset with the combustion chamber such that the driven shaft passes centrally therethrough;
   (d) a circular combustion rotor fixed concentrically to the shaft member for rotation eccentrically within the combustion chamber, the combustion rotor being positioned such that the space between the periphery of the rotor and the periphery of the combustion chamber results in a crescent shape;
   (e) a circular compression rotor fixed concentrically to the shaft member for rotation eccentrically within the compression chamber, the compression rotor being positioned such that the space between the periphery of the rotor and the periphery of the compression chamber results in a crescent shape which is in a generally opposed relationship with said crescent shape formed in the combustion chamber;
   (f) a first radial slot means formed radially through the compression rotor;
   (g) a first circular guide track formed within a sidewall of the compression chamber concentric with the axial centerline thereof;
   (h) a first piston-vane disposed within the first radial slot means and in mechanical communication with the first circular guide track such that the first pistonvane moves reciprocatively relative to the compression rotor as the same rotates within the compression chamber, the first piston-vane being dimensioned such that its distal end is in sliding engagement with the peripheral wall of the compression chamber;
   (i) a second radial slot means formed radially through the combustion rotor;
   (j) a second circular guide track within the sidewall of the combustion chamber concentric with the axial centerline thereof;
   (k) a second piston-vane disposed within the second radial slot means and in mechanical communication with the second circular guide track such that the second piston-vane moves reciprocatively relative to the combustion rotor as the same rotates within the combustion chamber, the second piston-vane being dimensioned such that its distal end is in sliding engagement with the peripheral wall of the combustion chamber;
   (l) a port means for providing a communicative gaseous flow between the compression chamber and the combustion chamber, the port means being formed and located within the compression chamber such that the compression rotor blocks the flow of compressed gases into the port means except when the first radial slot means is in registry with the port means, and the port means being located within the combustion chamber such that the combustion rotor blocks the flow of compressed gases into the combustion chamber except when the second radial slot means is in registry with the port means.

2. An improved rotary combustion engine according to claim 1 wherein the first radial slot means includes a first cut-out slot formed in the periphery of the compression rotor adjacent the leading side of the first piston-vane, and the second radial slot means includes a second cut-out slot formed in the periphery of the combustion rotor adjacent the trailing side of the second piston-vane.

3. An improved rotary combustion engine according to claim 2 wherein the port means is arcuate shaped and positioned for registry with said first and second cut-out slots, and otherwise is blocked by the sides of the compression and combustion rotors.

4. An improved rotary combustion engine according to claim 3 wherein the combustion piston vane is positioned to lead the compression piston vane by at least 1° in the direction of driven rotation.

5. An improved rotary combustion engine according to claim 3 wherein the first cut-out slot comes into registry with the arcuate port at a point after the combustion rotor reaches its apex.

6. An improved rotary combustion engine according to claim 5 wherein the second cut-out slot comes into registry with the arcuate port at a point before the compression rotor reaches its apex.

7. An improved rotary combustion engine according to claim 6 wherein the compression and combustion chambers are spatially offset by an elevation of at least 2° from horizontal.

8. An improved rotary combustion engine according to claim 7 wherein the compression and combustion chambers are spatially offset by an elevation of from about 3° to 60° from horizontal.

9. An improved rotary combustion engine according to claim 8 wherein the compression chamber includes a port for receiving a fuel mixture.

10. An improved rotary combustion engine according to claim 9 wherein the combustion chamber includes an exit port to permit release of combusted gases.

* * * * *